Figure 6:
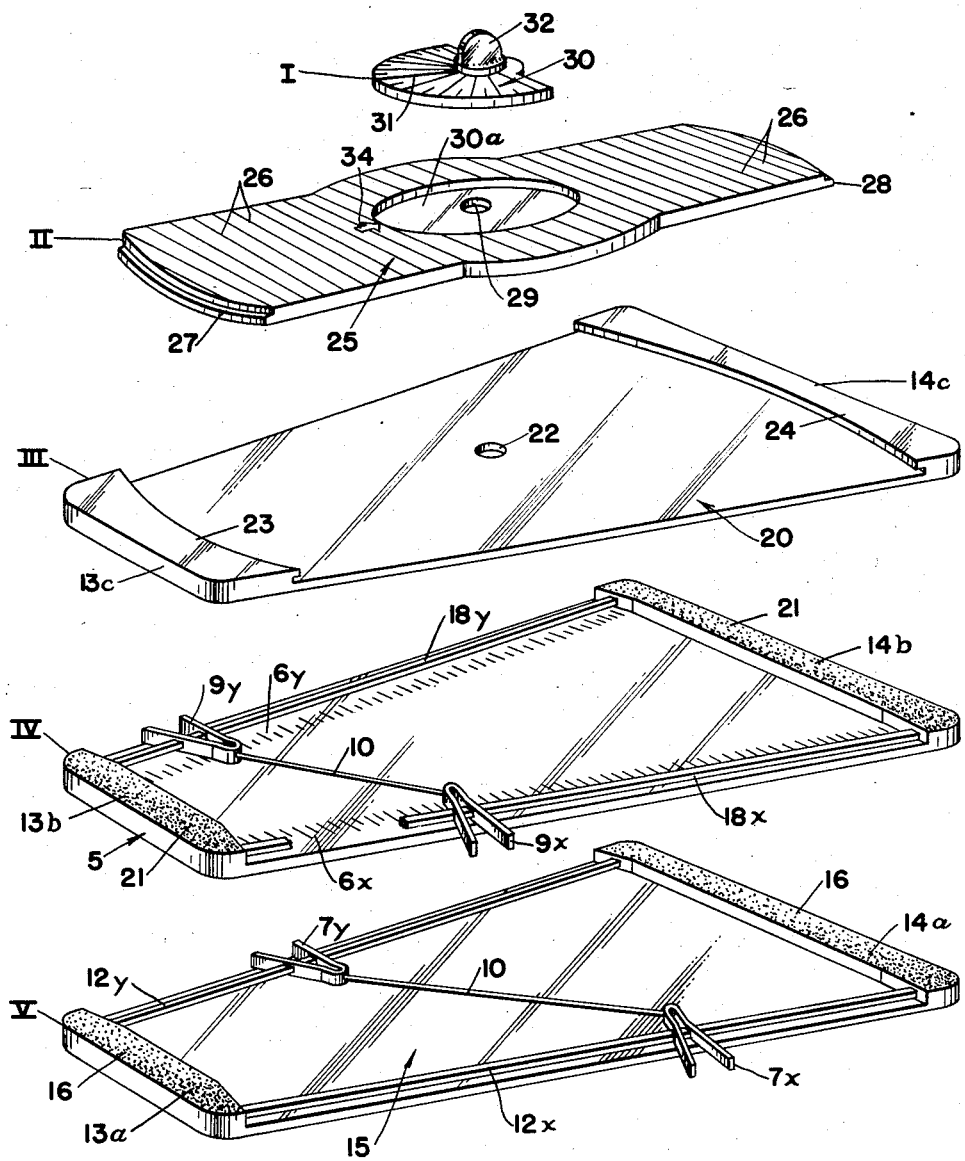

Oct. 28, 1958 — R. C. ANDERSON — 2,858,068
COMPARATIVE RATIO INDICATOR
Filed Nov. 9, 1955 — 3 Sheets-Sheet 1
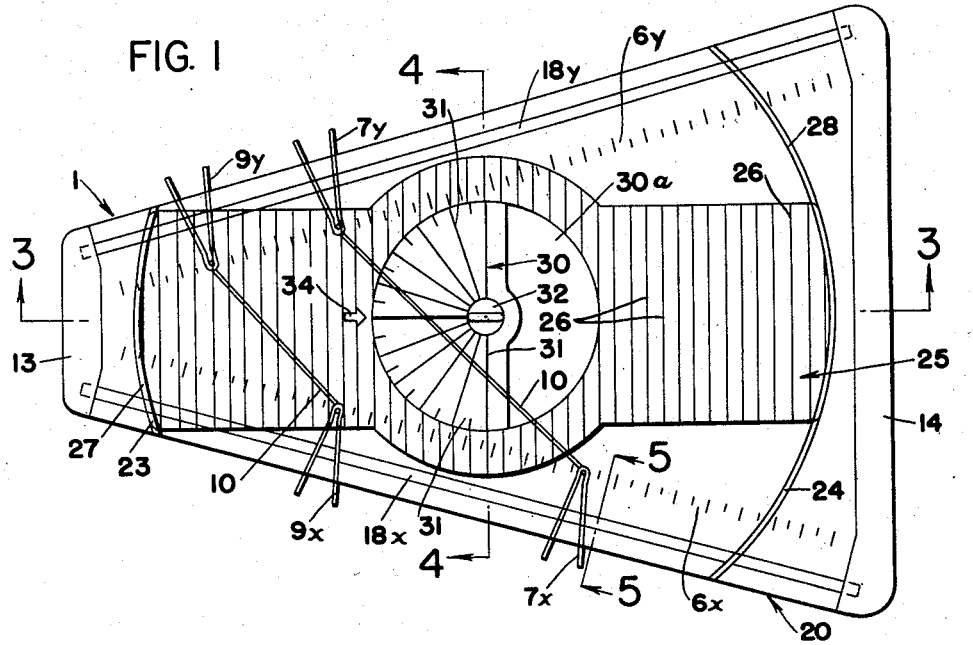
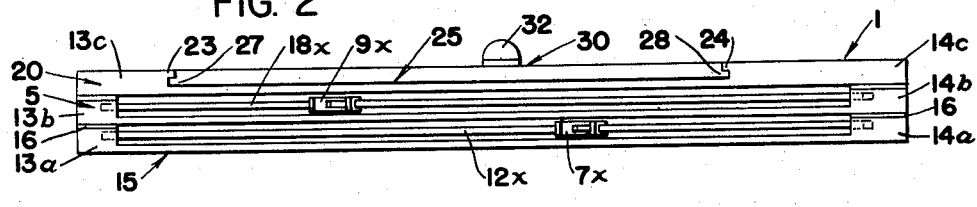
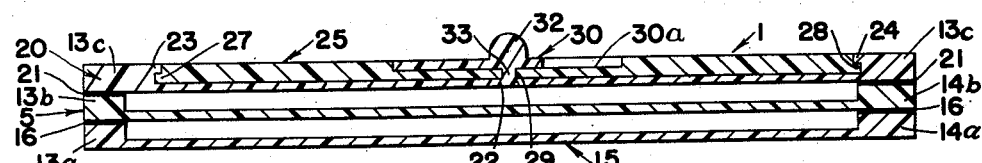
INVENTOR.
ROBERT CHARLES ANDERSON Oct. 28, 1958 R. C. ANDERSON 2,858,068
COMPARATIVE RATIO INDICATOR
Filed Nov. 9, 1955 3 Sheets-Sheet 3

INVENTOR.
ROBERT CHARLES ANDERSON
BY *Ely, Frye & Hamilton*
ATTORNEYS

United States Patent Office 2,858,068
Patented Oct. 28, 1958

2,858,068

COMPARATIVE RATIO INDICATOR

Robert Charles Anderson, Akron, Ohio

Application November 9, 1955, Serial No. 545,986

6 Claims. (Cl. 235—61)

The present invention relates to an apparatus for indicating and determining the difference between comparative ratios. More particularly, the invention relates to an apparatus, and the use thereof, whereby the difference between two or more sets of numerical data may be indicated or readily determined.

The average person is continuously being confronted with situations where he would like to determine, in a simple manner, the amount of something per unit of measurement. For example, in supermarket shopping, a purchaser is often presented with the problem of choosing between a small can of something containing $x$ ounces for a cost of $y$ cents, and a larger can containing $x'$ ounces for a cost of $y'$ cents. The decision whether to buy a small or large can is often based on determining which price ratio, $y/x$ or $y'/x'$, is the higher (or lower). All other factors being equal, the purchaser will generally choose that can which gives him the highest amount of something for the lowest amount of cost, that is, the most $x$ for the least $y$. As my invention is described hereinafter, other uses therefor, such as the determination of aircraft weight/fuel ratios, freight density/weight ratios, and other mathematical determinations will suggest themselves.

Accordingly, it is an object of my invention to provide an apparatus for visually indicating comparative ratios. Further, it is an object to provide an apparatus for determining the degree of difference between two or more sets of any numerical data which can be expressed on linear scales.

These and other objects of my invention will be apparent in view of the following detailed description thereof taken in conjunction with the attached drawings.

Figure 7:
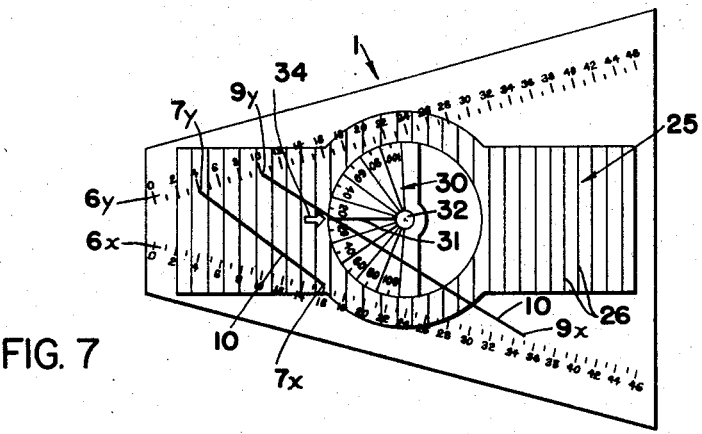
Figure 8:
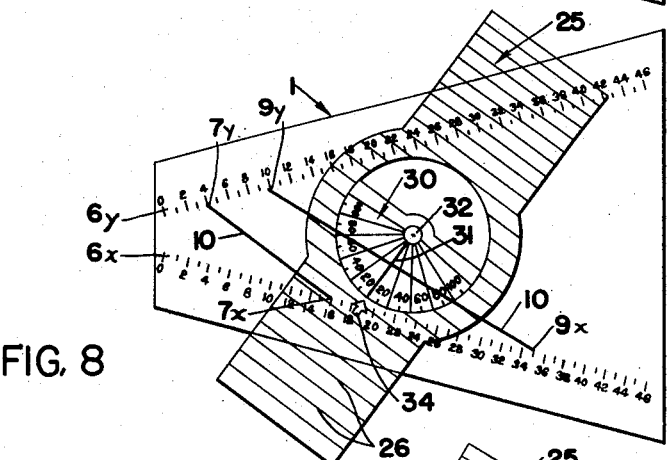
Figure 9:
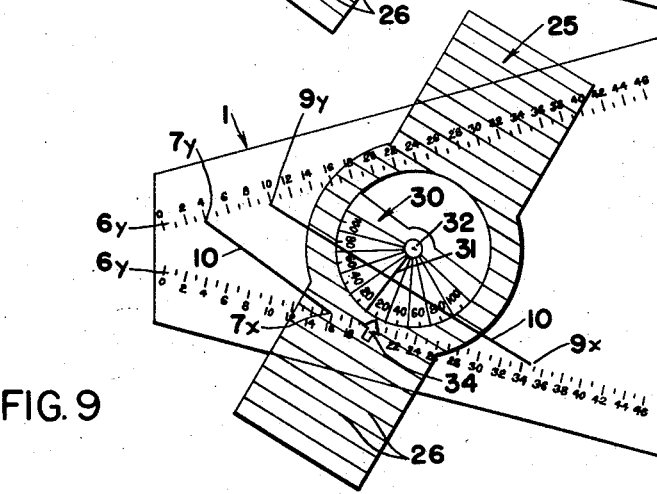

In the drawings:

Fig. 1 is a plan view of a preferred form of apparatus according to the invention, Fig. 2 is a side view of Fig. 1, Fig. 3 is a side view in section taken substantially on line 3—3 of Fig. 1, Fig. 4 is a transverse section taken substantially on line 4—4 of Fig. 1, Fig. 5 is an enlarged partial section taken substantially on line 5—5 of Fig. 1, Fig. 6 is an exploded isometric view of the indicator of Fig. 1, the several views thereof being designated as plates I, II, etc., and Figs. 7, 8 and 9 are schematic views illustrating the use of the apparatus of Fig. 1.

As shown and described herein, the apparatus for indicating comparative ratios, indicated generally by the numeral 1, comprises a transparent scale member with opposed linear scales marked thereon, a pair of pointers interconnected by an elastic filament and independently movable along the scales, and a second pair of pointers, also interconnected by an elastic filament and also separately movable in relation to points on the scales.

Referring to plates IV and V of Fig. 6, the scale portion or plate member of the apparatus 1 is indicated generally by the numeral 5 and has two opposed linear scales, 6x and 6y, marked thereon by etching, molding or other suitable means. The scales 6 are preferably disposed in somewhat divergent relation to each other. If the scales were marked exactly parallel to each other, the number of graduations with respect to the overall length of the scale portion 5 would be reduced. If the scales 6 were more divergent than shown (see Fig. 1), then the width of the scale portion 5 would have to be increased. I have found that marking the scales on diverging axes 30° apart provides the maximum number of graduations for minimum width of the apparatus 1. However, the 30° divergence is a feature of a preferred form of my invention and therefore, any degree of divergence is deemed to be within the scope of my invention so long as the scales 6x and 6y are opposed to one another.

Referring still to Fig. 6, the first set of pointer means are indicated by the numerals 7x and 7y, and the second set of pointer means by 9x and 9y. Each set of pointer means are interconnected, one to the other, by a stretchable filament means 10, of rubber, elastic or other suitable material. The purpose of the filaments 10 is to define and indicate the ratio between a setting of pointer 7x (or 9x) on scale 6x; and pointer 7y (or 9y) on scale 6y. If the ratios of the setting of pointers 7x/7y and 9x/9y are the same, the ratio-indicating filaments 10 will be parallel to each other. If the ratios are dissimilar, the indicating filaments will diverge from one another. The degree of divergence represents the difference between ratios 7x/7y and 9x/9y and, as described hereinafter, my apparatus 1 includes provisions for measuring the difference and expressing it as a percentage value.

As further described, the apparatus 1 may include the several elements shown in Figs. 1–6. Referring specifically to Figs. 2, 3 and plate V of Fig. 6, the first set of pointer means, 7x and 7y, may be in the form of clip-like springs which are movable, when pinched together, along rails 12x and 12y located beneath scales 6x and 6y, respectively. Either end of the rails 12 are supported in upwardly extending portions 13a and 14a of a base plate portion or member indicated generally by the numeral 15. Portions 13a and 14a are joined with the scale member 5 as at 16 by an integral, adhesive or other suitable bond. The base member 15 thus defines an area wherein, and the rails 12 provide a means whereby, the pointers 7 may be independently moved and set at any desired graduation along the full length of the scales 6.

Referring to Figs. 2, 3 and plate IV of Fig. 6, the second set of pointer means, 9x and 9y, may also be clip-like springs which are movable along rails 18x and 18y located above scales 6x and 6y, respectively. Either end of the rails 18 are supported in upwardly extending portions 13b and 14b of the scale member 5. As with the pointers 7, the pointers 9 may be independently moved and set at any desired graduation along the full length of the scales 6.

Referring to Figs. 2, 3 and plate III of Fig. 6, a grid support and holding member, indicated generally by the numeral 20, may be joined as at 21 by an integral, adhesive or other suitable bond, to the portions 13b and 14b of the scale member 5. At the middle of the member 20, preferably on the axial center lines, is a bore 22 so that the member 20 can function as a bearing for rotation of the grid 25, as described hereinafter. The member 20 also has upwardly extending portions 13c and 14c which extend laterally inward to provide curved, flanged portions as at 23 and 24.

Referring to plate II of Fig. 6, a grid member, indicated generally by the numeral 25, provides a means whereby the degree of divergence of the ratio-indicating filaments 10 from parallelism with each other can be determined. The grid 25, as shown, is generally of rectangular shape, having a series of equally spaced, parallel lines 26 marked transversely thereon, and further having curved, flanged end portions 27 and 28 which are slidably engaged beneath the flanges of portions 23 and 24, respectively, of the grid support member 20 (see Figs. 2 or 3). At the middle of the member 25 is a bore 29 which aligns with the bore 22. Extending circumferentially about the bore 29 is a recessed portion 30a which is used to receive a hemicircular shaped vernier member 30.

As viewed in Figs. 3, 4 and plate I of Fig. 6, the vernier member, indicated generally by the numeral 30, has a series of radially directed calibrations or graduations 31 marked thereon in a 180° arc along the edge. A knob or button 32 is provided to maintain the vernier member in a selected position within the recess 30a, upon an axle-like portion 33 extending through the bore 29 of the grid and secured in the bore 22 of the grid support member 20 while the grid member 25 is rotated as described hereinafter. An arrow 34 or other suitable means is preferably placed on the axial center line of the grid 25 at a point adjacent to the recess 30a so as to provide an indexing point for the graduations 31 on the vernier member.

The material used in the construction of the apparatus 1, with exception of the filaments 10, may be any suitable molded, cast or otherwise formed plastic, or composite of plastic and metal material, having mechanical rigidity and shock resistance. The scale member 5 and the grid member 25 in the embodiment shown should be transparent, so that the pointers 7 may easily be located at desired points along the scales 6.

Figs. 7–9 afford an illustration of a specific use for the apparatus 1, namely, determining the comparative price of a small can of something containing 4 ounces and priced at $.16 (cents) and a larger can containing 10 ounces and costing $.35 (cents). As stated above, this is only one use for the apparatus and the principles involved could be used for determining the difference between any sets of numerical data expressible on linear scales.

In Figs. 7–9, scale 6x is the price scale and scale 6y is the ounce scale. The ratio 4 ounces/16 cents is established by the respective pointers 7x and 7y and is indicated by the left hand filament 10, as viewed in the drawings. The ratio 10 ounces/35 cents is established by the pointers 9x and 9y and is indicated by the right hand filament 10 as shown in Figs. 7–9.

Referring solely to Fig. 7, it is possible to determine visually which can on a price per ounce basis is cheaper. As viewed in Fig. 7, the filament which is the more nearly vertical represents that ratio which is lower. That is, the right hand filament represents a 10/35, ounce/cent ratio, or 3.5 cents per ounce. The left hand filament represents a 4 cents per ounce ratio. Thus, if the purchase is being made solely on a relative cost basis, the purchaser will select the larger can with a saving of 0.5 cent per ounce.

However, the purchaser may be desirous of determining the percentage of saving. Figs. 8 and 9 illustrate the use of the vernier member 30 to determine this figure. For purposes of ease in discussion, values on the scales 6 have been chosen which show a 12.5% (0.5 cent per ounce) saving. To determine this, the user first sets the vernier member with its zero, or no percent, graduation 31 directly opposite the arrow 34. He then rotates the grid member 25, until the lines 26 are parallel with the left-hand filament 10, as shown in Fig. 8. He then grasps the knob 32 so that the vernier member 30 will not move, and rotates the grid 25 so that the lines 26 are now parallel with the second or right-hand filament. This causes the vernier 30 to move in relation to the arrow 34 which now is in alignment with the graduation 31 which indicates the percentage of saving; in this case somewhere between 10 and 15% as shown on the vernier member 30.

It will be apparent that changes and modifications could be made in the embodiment of my invention as described herein. For example, indicating the percentage of saving in the problem set out in Figs. 7–9, to even one decimal point, is superfluous when the device is used for the comparative pricing of goods in a supermarket. However, the use of the vernier member 30 does permit great accuracy if the graduations 31 are suitably calibrated. Likewise, with respect to the accuracy of the scales 6x and 6y, whose degree of accuracy is determined solely by the nature of the problem being solved. These and other obvious changes and modifications as suggest themselves are within the spirit and scope of the invention, and therefore, within the intended spirit and scope of the subjoined claims.

What is claimed is:

1. An apparatus for indicating comparative ratios comprising, a transparent member having divergent opposed linear scales marked thereon, a first set of pointer means above and mounted for movement along each of said scales, a first filament means interconnecting said first pointer means, a second set of pointer means below and mounted for movement along each of said scales, and a second filament means interconnecting said second pointer means.

2. An apparatus for indicating comparative ratios comprising, a transparent member having two opposed linear scales marked thereon, a first pair of pointer means above and mounted for movement along each of said scales, a first filament means interconnecting said first pointer means, a second pair of pointer means below and mounted for movement along each of said scales, and a second filament means interconnecting said second pointer means.

3. An apparatus for determining difference in ratios comprising: a scale member having divergent opposed linear scales marked thereon; a first set of pointer means, interconnected by a filament, mounted for movement along each of said scales; a second set of pointer means, interconnected by a filament, mounted for movement along each of said scales; said filaments indicating the ratio of their respective pointer means as placed in relation to said scales; a grid member between said linear scales having parallel grid lines marked thereon and movable in relation to said filaments; and a vernier member having radially directed calibrations rotatably mounted on said grid member for determining the extent by which said filaments differ from parallelism with each other.

4. An apparatus for determining difference in ratios comprising: a scale member having two divergent opposed linear scales marked thereon; a first pair of pointer means, interconnected by a filament mounted for movement along each of said scales; a second pair of pointer means, interconnected by a filament, mounted for movement along each of said scales; said filaments indicating the ratio of their respective pointer means as placed in relation to said scales; a grid member between said linear scales having parallel grid lines marked thereon and movable in relation to said filaments; and a vernier member having radially directed calibrations rotatably mounted on said grid member for determining the extent by which said filaments differ from parallelism with each other.

5. An apparatus for determining difference in ratios comprising: a transparent member having two divergent opposed linear scales marked thereon; a first pair of pointer means, interconnected by a filament, above and mounted for movement along each of said scales; a second pair of pointer means, interconnected by a filament, below and mounted for movement along each of said scales; said filaments indicating the ratio of their respective pointer means as placed in relation to said scales; a transparent grid member between said linear scales having a series of parallel grid lines marked thereon and rotatable in relation to said filaments about an axis between said scales; and a vernier member having radially directed calibrations rotatably mounted on said grid member for determining the extent by which said filaments differ from parallelism with each other.

6. An apparatus for determining difference in ratios comprising: a transparent member having two divergent opposed linear scales marked thereon; a first pair of pointer means, interconnected by a filament, above and mounted for movement along each of said scales; a second pair of pointer means, interconnected by a filament, below and mounted for movement along each of said scales; said filaments indicating the ratio of their respective pointer means as placed in relation to said scales; a grid member between said linear scales having a series of parallel, transverse lines marked thereon, a recessed portion thereon, and being rotatable in relation to said filaments; and a hemi-circular vernier member having radially directed calibrations and rotatable within said recessed portion for determining the extent by which said filaments differ from parallelism with each other.

References Cited in the file of this patent

UNITED STATES PATENTS

| | | |
|---|---|---|
| 2,296,799 | Rosin | Sept. 22, 1942 |
| 2,438,730 | Watter | Mar. 30, 1948 |
| 2,507,460 | Schacht | May 9, 1950 |